United States Patent [19]

Storace

[11] 4,072,202

[45] Feb. 7, 1978

[54] ELASTIC-TYPE CLAMP FOR A TWIN LEAF SPRING SCALE

[75] Inventor: Anthony Storace, Tarrytown, N.Y.

[73] Assignee: Pitney-Bowes, Inc., Stamford, Conn.

[21] Appl. No.: 756,485

[22] Filed: Jan. 3, 1977

[51] Int. Cl.² .............................................. G01G 3/08
[52] U.S. Cl. ................................................... 177/229
[58] Field of Search ........................................ 177/229

[56] References Cited

U.S. PATENT DOCUMENTS

| | | | |
|---|---|---|---|
| 3,667,560 | 6/1972 | Cooke | 177/229 X |
| 3,701,392 | 10/1972 | Wirth et al. | 177/210 |
| 4,022,288 | 5/1977 | Canevari | 177/229 |

Primary Examiner—George H. Miller, Jr.

Attorney, Agent, or Firm—Robert S. Salzman; William D. Soltow, Jr.; Albert W. Scribner

[57] ABSTRACT

An elastic-type clamp is used for securing weighing scale flexure plates to a load support. The elastic-type clamp eliminates uncontrolled and unpredictable deflection characteristics of the plates, which were the result of changing boundary conditions and manufacturing differences in the bite of the previously used inelastic clamp. The lips of the inventive clamp are made deformable under load, or as strain develops in the flexure plates. The ability of the clamp to elastically deform prevents slippage of the flexure plates about their point of securement to the load support. This in turn will reduce load measurement errors inherent with the previous inelastic clamping design.

4 Claims, 4 Drawing Figures

ELASTIC-TYPE CLAMP FOR A TWIN LEAF SPRING SCALE

The invention relates to structural weighing scale members, and more particularly to an elastic-type clamp for securing weighing scale flexure plates to the load support structure.

BACKGROUND OF THE INVENTION

Heretofore, it was very common to observe load measuring errors in leaf spring-type scales. While these errors were not relatively large, they were significant where high measuring accuracies were expected. In addition, the errors in the measurements were both unpredictable and uncompensatory. These errors were due to difficulties in properly clamping the leaf springs to the load support of the weighing scale.

At the juncture or root of an inelastic clamp and flexure plate, varying stresses and strains exist. The variation in these stresses and strains are not always predictable or uniform, so that variations in the deflection characteristics of the load support vary uncontrollably. This naturally impairs the accuracy of the weighing scale.

The clamping variations in the bite of the inelastic clamp are often the result of manufacturing and assembly variations. Also, there are observed changes due to temperature variations. The net result is that the boundary conditions at the inelastic clamp are often unknown and unpredictable.

The present inventive clamp and flexure plate assembly, eliminates all of the aforementioned problems in leaf spring weighing scale construction.

SUMMARY OF THE INVENTION

The invention pertains to an elastic-type clamp for sandwiching a plate to a load support structure of a weighing scale. The clamp comprises two adjacently disposed channel members. Each channel member has a "U"-shaped cross section with both legs of the "U" disposed upon the plate. Each channel member is on opposite sides of the plate, and when fastened together, they sandwich the plate therebetween.

One leg of each "U" of the channel members is relatively much thinner than its corresponding leg. Thus, when the flexure plate is caused to deflect, the thinner leg of each "U" will be caused to elastically deform. This deformation will provide the plate with a predictable and controlled deflection characteristic.

The upper channel member will experience a tensile force upon its deformable leg, causing this leg to pull laterally outward.

The lower channel member will experience a compressive force upon its deformable leg, causing this leg to be pushed laterally inward.

Generally speaking, the thinner legs of each channel member will be half the thickness or less than the other leg of the respective channel member, and each deformable (thinner leg) will have a length which is approximately five to 10 times its thickness.

It is an object of the invention to provide an improved leaf spring weighing scale construction;

It is another object of this invention to provide a leaf spring weighing scale construction which has a predictable and controlled deflection characteristic for its leaf springs;

It is a further object of the invention to provide an improved load support construction for a leaf spring weighing scale, which will produce a weighing scale of improved load-measuring accuracy;

These and other objects of this invention will become more apparent and will be better understood with reference for the following detailed description taken in conjunction with the accompanying drawings, in which.

DETAILED DESCRIPTION

Figure 1:
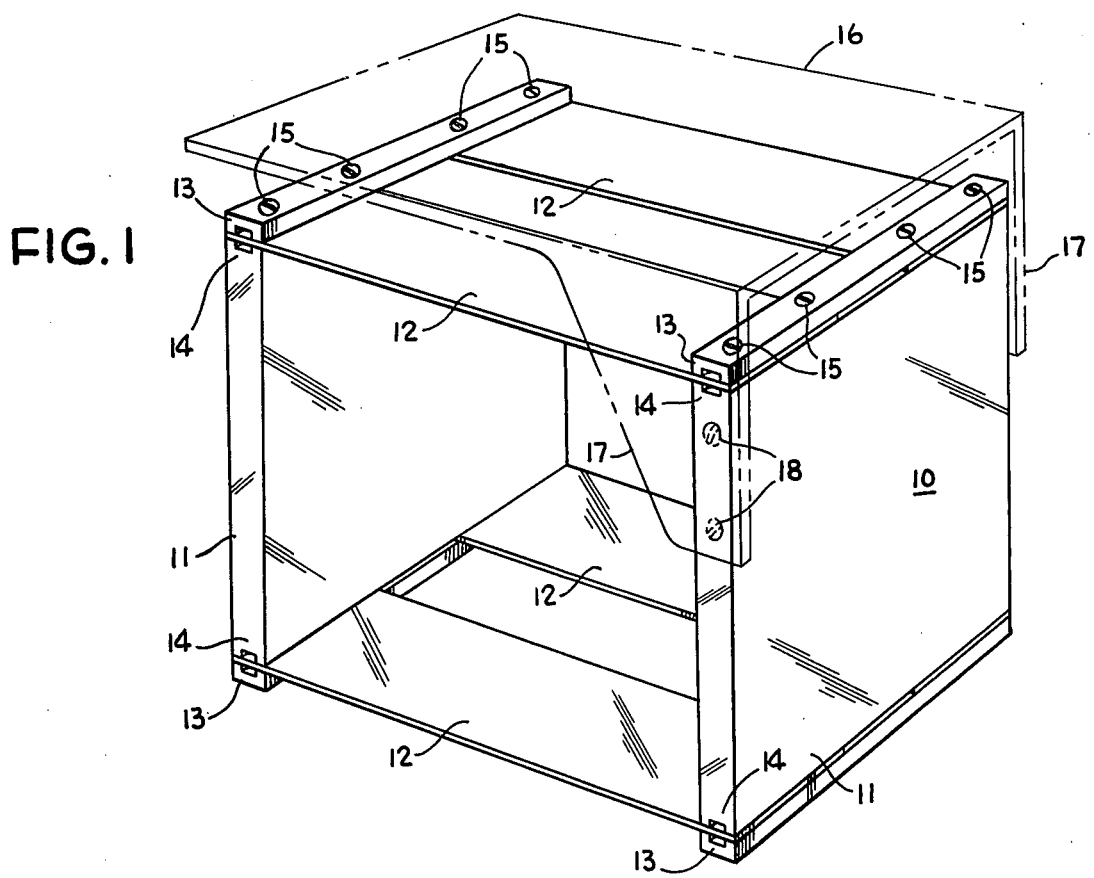
FIG. 1 is a perspective view of a typical leaf spring weighing scale load support for which the inventive clamp is intended.

Now referring to FIG. 1, a typical load support structure 10 is shown for a leaf spring weighing scale. The load support 10 comprises two side walls 11 to which is attached leaf springs (plates) 12. The plates 12 are clamped to the walls 11 by means of elongated clamping bars 13. The clamping bars 13 have a "U"-shaped cross section, as is more clearly illustrated in FIG. 2. The ends 14 of each wall 11 are fashioned to be the corresponding counterparts to the clamps 13, i.e. the plates 12 are sandwiched between two clamp cross sections 13 and 14. The clamps 13 and 14 are secured together by means of screws 15 or other suitable fastener means.

Figure 2:
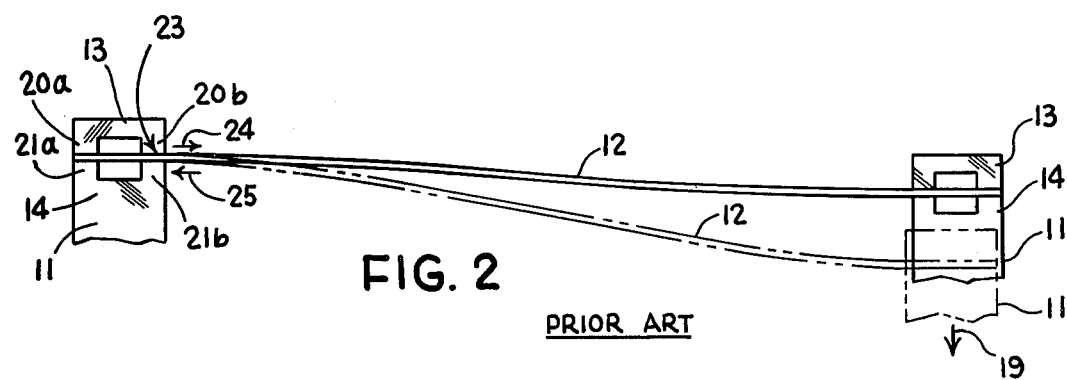
FIG. 2 is a partial side view of the prior art clamp and leaf spring combination.

A weighing pan 16, shown in phantom, is attached via screws 18 to one of the walls 11 via flanges 17. When a load is placed on the pan 16, the wall 11 will move downwardly (arrow 19) with respect to the other fixed stationary wall 11, as depicted in FIG. 2.

When the wall 11 is caused to move, the plates 12 are put into bending deflection as shown in phantom. Only the upper half of structure 10 is shown for the sake of brevity.

Clamping channel 13 of the prior design was symmetrical, and had legs 20a of the same length and thickness as the other leg 20b of the "U"-shaped cross section.

Similarly, the clamping channel 14 was also symmetrical, i.e. leg 21a had the same dimensions as leg 21b of the "U"-shaped cross section of the prior clamping design.

The problem with this prior clamping design, was that the root or junction 23 of the clamp bite so confined the plates 12, that the plates 12 experienced conflicting stress concentrations. In other words, as the plates 12 deflected under load (arrow 19) a tensile stress (arrow 24) developed in the upper half of the plates 12, and a compressive stress (arrow 25) developed in the lower half of the plates 12.

These conflicting stress concentrations would cause the plates to suddenly slip from between the clamp channels 13 and 14 at odd moments, i.e. the plates might slip at any unpredictable level of force or deflection.

This slippage was most undesirable, because it created an error in the weighing measurements that was unpredictable, and was incapable of compensation. To further compound the problem, manufacturing tolerances, and temperature effects also contributed to the sudden slippage phenomenon. Even the forces exerted by the tightening of the screws 15 (FIG. 1) contributed to the problem.

The clamps could not be tightened to prevent the slippage due to the uneven contact surfaces between the clamps 13 and 14, respectively, and plates 12. Also, the structural limits of the screws were not adequate to provide the necessary clamping forces required to prevent slippage.

Figures 3, 4:
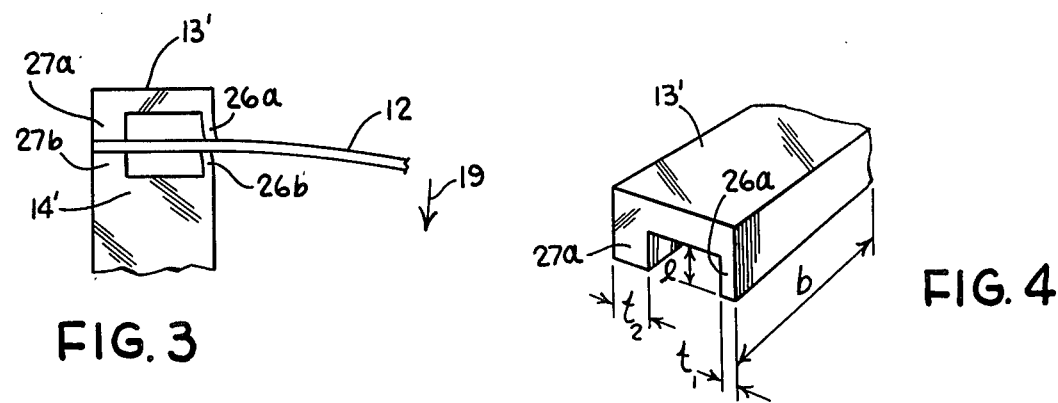
FIG. 3 is a side view of the inventive clamp with a deflected leaf spring sandwiched therein.
FIG. 4 is a partial perspective view of one half of the inventive clamp shown in FIG. 3.

The invention will be described with respect to FIGS. 3 and 4, and features a deformable clamping arrangement which will allow the plates 12 to bend with an even, slippage free deflection.

The new inventive clamps 13' and 14', respectively, are designed to have deformable lips 26a and 26b, respectively. These deformable lips will give (move laterally) to accommodate the tensile and compressive forces as the plate 12 deflects (arrow 19). The upper lip 26a will bend outwardly, while the lower lip 26b will bend inwardly, as shown. The particular illustration (FIG. 3) is an enlarged exaggerated view, for the purpose of providing a clear understanding of the functionality of the invention.

The force "F" required to deform the lip 26a or 26b by an amount "X" is given by the following expression:

$$F = Kx = \frac{3EIx}{l^3} = \frac{Ebt_1^3 \cdot x}{4 \cdot l^3}$$

where:
- $X$ is the expected movement of the clamp surface due to strain.
- $K$ is the lateral spring constant of the clamp lip (26a or 26b) in pounds/inch.
- $t_1$ is the thickness of the lip 26a or 26b.
- $b$ is the width of the clamp lip 26a or 26b.
- $l$ is the length of the clamp lip 26a or 26b.
- $E$ is the Elasticity Modulus of the clamp in pounds per square inch. The maximum friction force to hold the plate to the clamp is given by:

$$T = M \cdot (P/2)$$

where:
- $P$ is the clamping force in pounds supplied by the screws 15.
- $M$ is the coefficient of static friction between the clamp and the plate.

For slippage not to occur, it is necessary that the following condition be true:

$$M \cdot \frac{P}{2} > \frac{Ebt_1^3 \cdot x}{4 \cdot l^3}$$

Solving for the clamping force $P$, we get:

$$P = \frac{2Ebt_1^3 \cdot x}{4 \, M \, l^3}$$

It has been found from calculation and experiment, that the thickness $t_1$ of lip 26a should be half or less the thickness $(t_2)$ of the leg 27a of clamp 13'.

Similarly, the thickness $t_1$ of lip 26b should be half or less than the thickness $t_2$ of leg 27b.

It has also been found that the length "$l$" of the respective lips 26a or 26b should be between 5 and 10 times the thickness $t_1$ to prevent buckling under the force "P."

Having thus described the invention, what is desired to be covered by Letters Patent is presented in the following appended claims.

What is claimed is:

1. An elastic-type clamp for sandwiching a leaf spring to a load support structure of a weighing scale, said clamp comprising two adjacently disposed channel members each having a "U"-shaped cross section with both legs of each "U"-shaped channel member disposed upon said leaf spring, each channel member being on opposite sides of said leaf spring, said channel members being fastened together with said leaf spring disposed therebetween, one leg of each "U"-shaped channel member being relatively much thinner than the other leg of said "U"-shaped channel member, whereby as the leaf spring is caused to deflect, the thinner leg of each "U"-shaped channel member will be caused to elastically deform, thus providing a controlled and predictable deflection characteristic for said leaf spring.

2. The elastic-type clamp of claim 1, wherein one of the elastically deformable legs will deform under a compressive force, and the other elastically deformable leg will deform under a tensile force.

3. The elastic-type clamp of claim 1, wherein the elastically deformable thinner leg of each channel member is half the thickness or less than the other leg of the respective channel member.

4. The elastic-type clamp of claim 1, wherein a length of the thinner leg of each channel member is approximately greater than five times its thickness, but approximately less than 10 times its thickness.

* * * * *